(12) United States Patent
Pancotti et al.

(10) Patent No.: US 8,381,630 B2
(45) Date of Patent: Feb. 26, 2013

(54) AIRCRAFT WING

(75) Inventors: Santino Pancotti, Gallarate (IT); Dante Ballerio, Caronno Varesino (IT)

(73) Assignee: Agusta S.p.A., Samarate (IT)

( * ) Notice: Subject to any disclaimer, the term of this patent is extended or adjusted under 35 U.S.C. 154(b) by 919 days.

(21) Appl. No.: 12/479,051

(22) Filed: Jun. 5, 2009

(65) Prior Publication Data

US 2010/0044508 A1 Feb. 25, 2010

(30) Foreign Application Priority Data

Jun. 9, 2008 (IT) .............................. TO2008A0445

(51) Int. Cl.
*F41A 9/29* (2006.01)
(52) U.S. Cl. .................... 89/33.14; 89/37.19; 244/129.1
(58) Field of Classification Search ................. 244/1 R, 244/129.1, 123.1; 89/37.19, 1.11, 1.1, 33.1, 89/34, 33.14
See application file for complete search history.

(56) References Cited

U.S. PATENT DOCUMENTS

| | | | | | |
|---|---|---|---|---|---|
| 2,342,022 | A | * | 2/1944 | Trimbach | 89/1.59 |
| 2,349,454 | A | | 5/1944 | O Hare et al. | |
| 2,364,509 | A | * | 12/1944 | Bertran et al. | 89/37.19 |
| 2,375,437 | A | | 5/1945 | O Hare | |
| 2,398,263 | A | * | 4/1946 | Trimbach | 89/34 |
| 2,709,947 | A | * | 6/1955 | Woods | 89/1.815 |
| 3,911,787 | A | | 10/1975 | Seibel | |
| 4,893,545 | A | * | 1/1990 | Sanderson et al. | 89/37.19 |
| 4,898,070 | A | * | 2/1990 | Kramer | 89/34 |
| 4,951,547 | A | * | 8/1990 | Novet et al. | 89/34 |
| 4,966,063 | A | * | 10/1990 | Sanderson et al. | 89/37.22 |
| 4,972,758 | A | * | 11/1990 | Austin et al. | 89/34 |
| 4,974,490 | A | * | 12/1990 | Austin | 89/34 |
| 5,024,138 | A | * | 6/1991 | Sanderson et al. | 89/37.22 |
| 5,111,729 | A | * | 5/1992 | Tassie | 89/33.02 |
| 5,206,454 | A | * | 4/1993 | Sanderson | 89/33.14 |
| 5,245,908 | A | * | 9/1993 | Sanderson | 89/34 |
| 5,253,574 | A | * | 10/1993 | Sanderson | 89/34 |
| 5,263,397 | A | * | 11/1993 | Sanderson | 89/37.22 |
| 5,390,582 | A | * | 2/1995 | Sanderson | 89/37.22 |
| 5,417,141 | A | * | 5/1995 | Sanderson | 89/37.22 |
| 5,419,234 | A | * | 5/1995 | Sanderson | 89/37.22 |
| 5,932,831 | A | | 8/1999 | Bandera | |
| 6,293,179 | B1 | * | 9/2001 | Sanderson | 89/37.03 |
| 7,481,147 | B1 | * | 1/2009 | Serkland et al. | 89/37.22 |
| 7,765,912 | B1 | * | 8/2010 | Serkland | 89/37.21 |
| 8,069,767 | B2 | * | 12/2011 | Deckard et al. | 89/33.4 |
| 8,151,684 | B2 | * | 4/2012 | Buechler et al. | 89/33.2 |
| 2009/0321554 | A1 | * | 12/2009 | Roesch | 244/6 |
| 2010/0294119 | A1 | * | 11/2010 | Buechler et al. | 89/33.2 |
| 2010/0294120 | A1 | * | 11/2010 | Deckard et al. | 89/33.4 |
| 2012/0137863 | A1 | * | 6/2012 | Buechler et al. | 89/33.14 |

FOREIGN PATENT DOCUMENTS

GB 2316157 B 12/2000

OTHER PUBLICATIONS

Extended European Search Report dated Mar. 19, 2012, which issued in corresponding EP Application No. 09162227.4.

* cited by examiner

*Primary Examiner* — Benjamin P Lee
(74) *Attorney, Agent, or Firm* — Fish & Richardson P.C.

(57) ABSTRACT

A wing for an aircraft having at least one weapon, and a feed duct for feeding the weapon with ammunition supplied in the form of a belt; the wing has a compartment for housing a portion of the belt and connectable to a loading opening of the feed duct.

12 Claims, 5 Drawing Sheets

AIRCRAFT WING

The present invention relates to an aircraft wing, in particular for a helicopter.

BACKGROUND OF THE INVENTION

Helicopters are known comprising a fuselage; a turret armed with a weapon at the front end of the fuselage; and two wings projecting from the fuselage and equipped with further weapons and/or auxiliary tanks.

More specifically, the turret comprises a weapon fed with ammunition on a continuous belt.

More specifically, the helicopter comprises a rigid duct having a rear loading end connected to an ammunition tank, and a front end close to the turret. As the weapon is fired, the ammunition belt runs into the duct through the front end, and along a portion outside the fuselage to the turret.

A need is felt within the industry to increase ammunition feed to the turret without impairing the aerodynamic characteristics of the helicopter.

SUMMARY OF THE INVENTION

It is an object of the present invention to provide a wing designed to achieve the above requirement cheaply and easily.

According to the present invention, there is provided a helicopter wing, as claimed in the attached Claims.

BRIEF DESCRIPTION OF THE DRAWINGS

A preferred, non-limiting embodiment of the present invention will be described by way of example with reference to the accompanying drawings, in which.

DETAILED DESCRIPTION OF THE INVENTION

Figure 1:
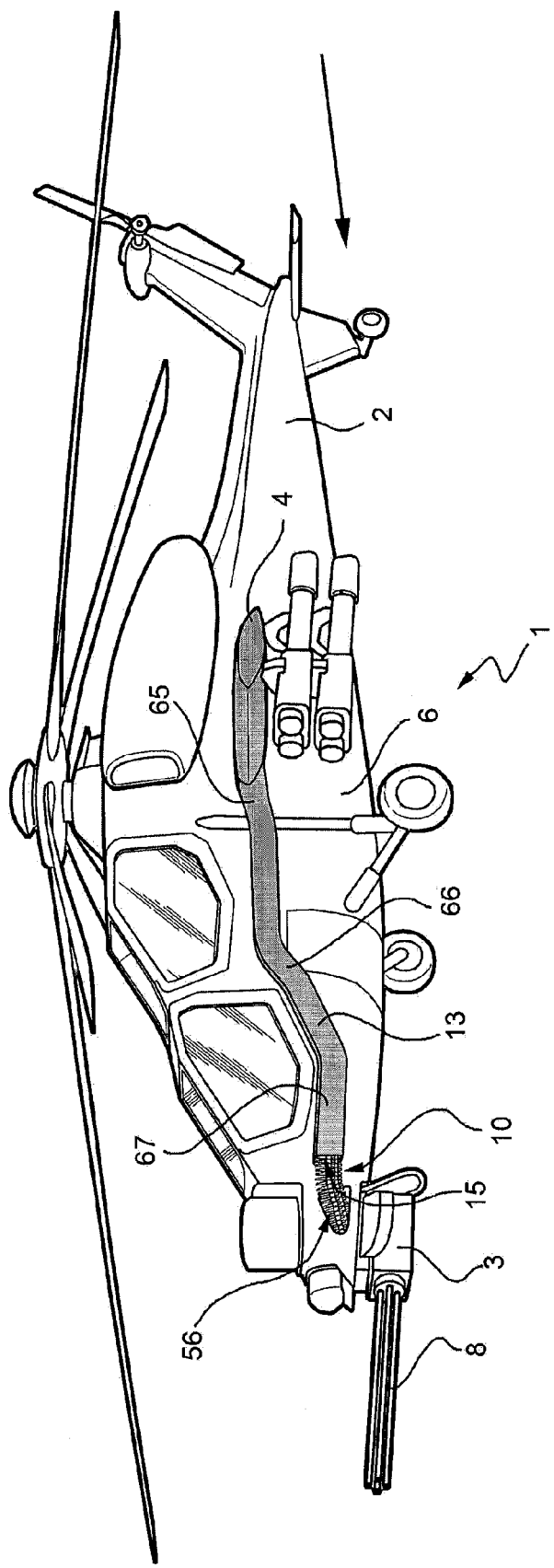
FIG. 1 shows a side view of a helicopter with an ammunition wing in accordance with the present invention.

Number 1 in FIG. 1 indicates a helicopter substantially comprising a fuselage 2; a rotary turret 3 at the front end of fuselage 2; and a first wing (not shown in FIG. 1) and a second wing 4 projecting respectively from a first side (not shown in FIG. 1) and a second side 6 of fuselage 2.

More specifically, the first side and second side 6 are opposite.

Helicopter 1 also comprises a main rotor on top of fuselage 2 and rotating about a first axis; and a tail rotor fitted to a fin projecting from the fuselage at the opposite end to turret 3, and rotating about a second axis crosswise to the first axis.

It should be pointed put that the terms "front", "rear", "top", "bottom" and similar in the following description are used purely for the sake of clarity and with reference to the orientation and travelling direction of helicopter 1 as shown in FIG. 1.

Figure 3:
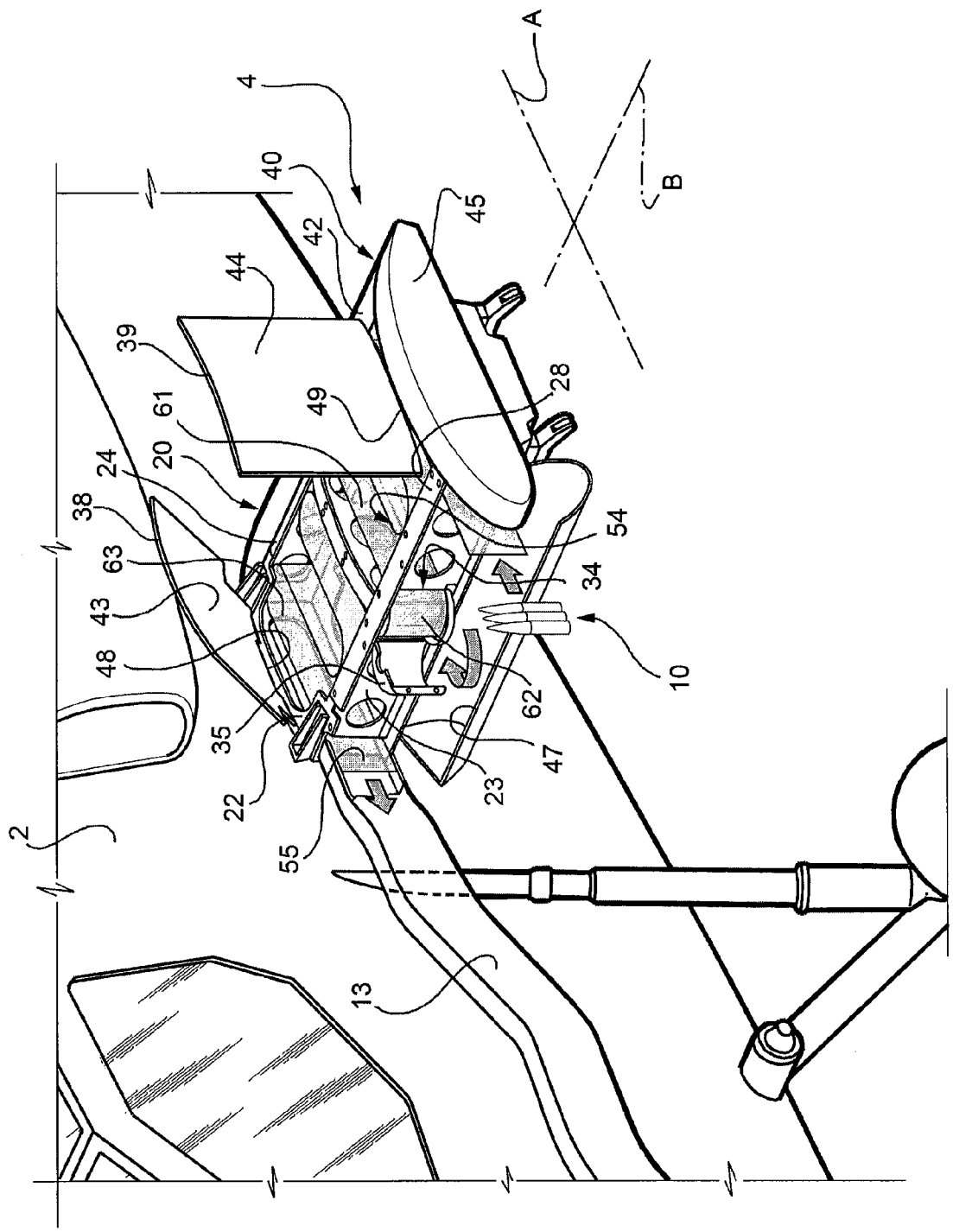
Figure 5:
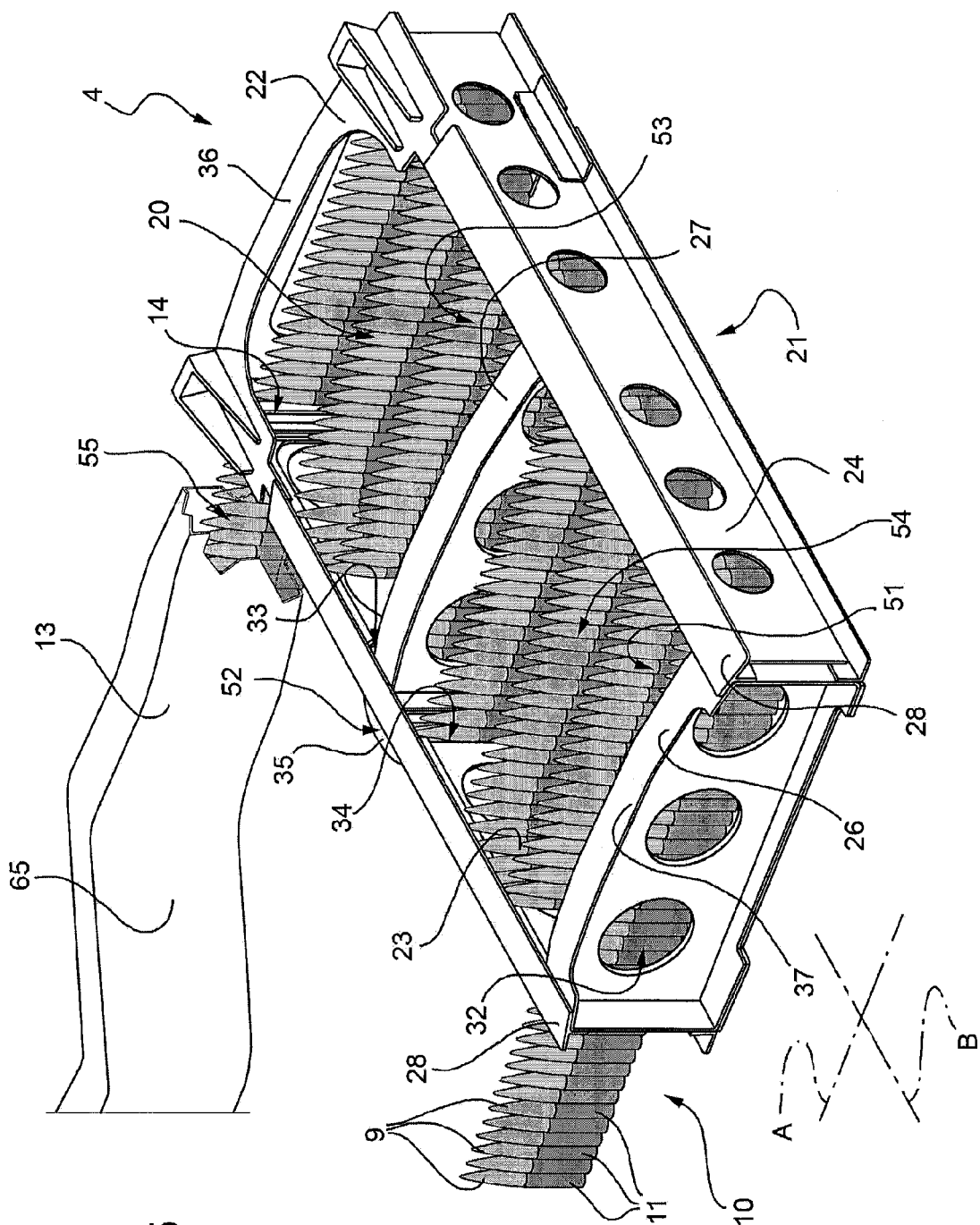

More specifically, turret 3 comprises a weapon 8 fed by an automatic loading system (not shown) with ammunition 9 (only shown partly in FIG. 5) on a continuous belt 10 (shown in detail in FIGS. 1 and 5 and schematically in FIG. 3). More specifically, belt 10 comprises a number of seating elements 11 (only some shown in FIG. 5) engaged releasably by the bottom ends of respective ammunition 9 and which alternate with a number of connecting elements not shown in the drawings.

Each element 11 is engaged coaxially by respective ammunition 9, and is connected to the connecting elements in articulated manner about the axes of ammunition 9.

Helicopter 1 also comprises a duct 13 for feeding ammunition 9 to weapon 8 and extending along side 6 on the outside of fuselage 2.

Figure 4:
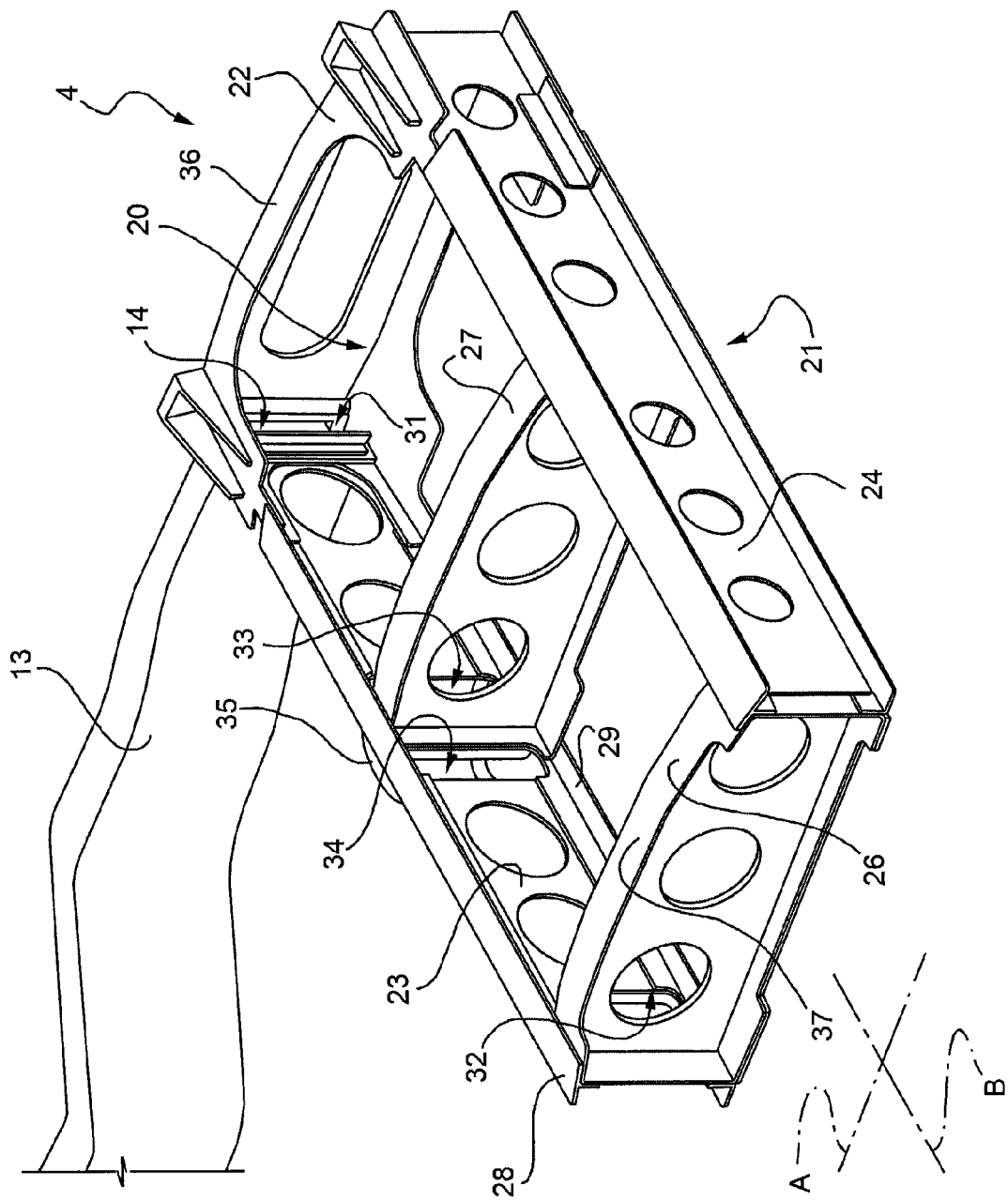
FIGS. 4 and 5 show larger-scale isometric views, with parts removed for clarity, of the FIG. 1-3 wing.

Duct 13 is rigid, and comprises a rear loading opening 14 (FIGS. 4 and 5), and an opening 15 (FIG. 1) at the opposite end to opening 14.

The underside of wing 4 supports other accessory devices of helicopter 1, such as rockets, missiles or other tanks.

Wing 4 (FIGS. 3, 4 and 5) advantageously comprises a compartment 20 housing a portion 54 of belt 10 and connectable to opening 14 of duct 13.

Figure 2:
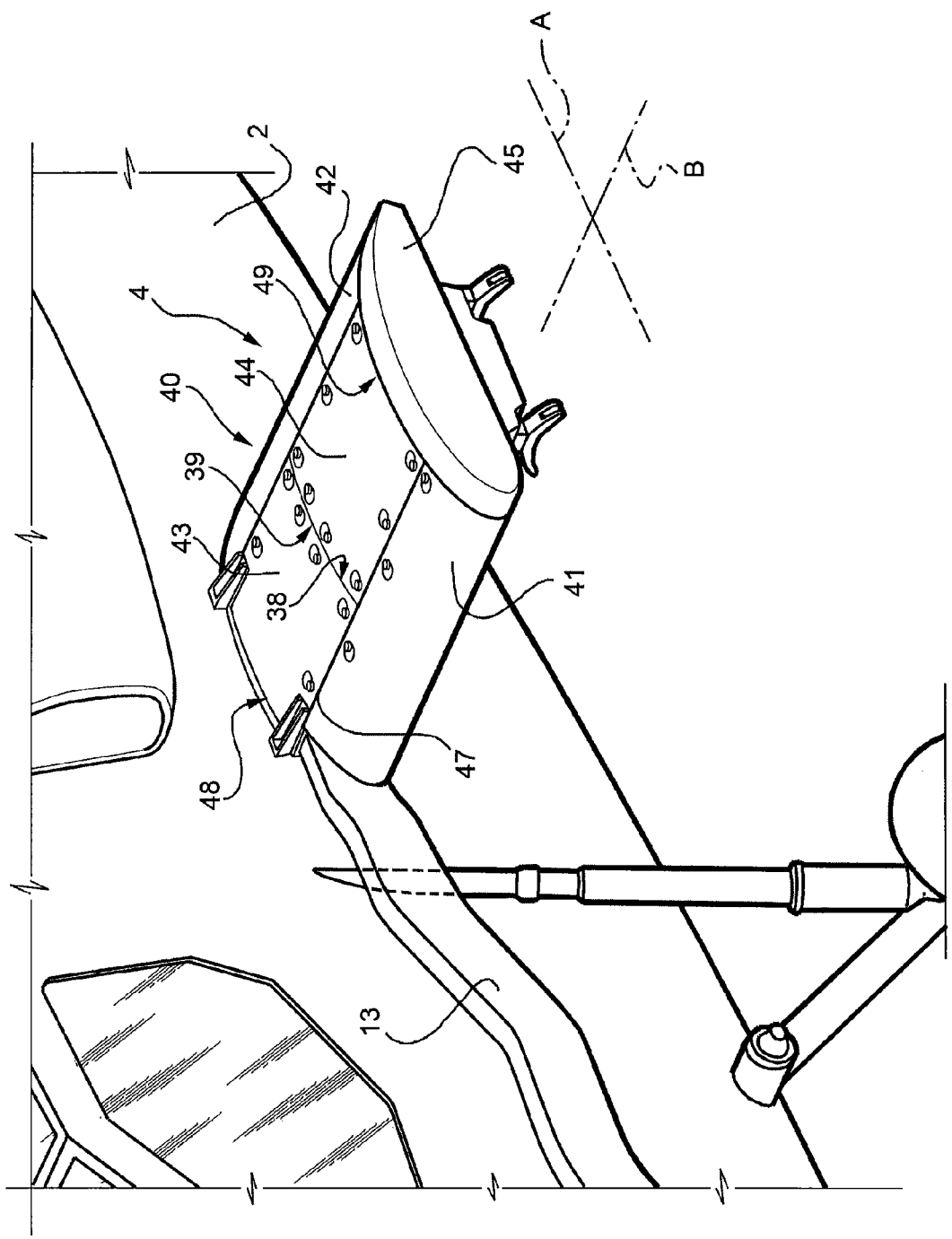
FIGS. 2 and 3 show larger-scale views in perspective of the FIG. 1 wing in a first and second configuration respectively.

More specifically, wing 4 comprises a frame 21 defining compartment 20; and a cover 40 covering frame 21 and defining, in the flight configuration of the helicopter shown in FIG. 2, an aerodynamic outer surface of wing 4 (FIGS. 2 to 5).

More specifically, frame 21 comprises (FIGS. 4 and 5):
- a cross member 22 connected to fuselage 2 and elongated in a direction A parallel to the lengthwise direction of fuselage 2;
- two parallel longitudinal members 23, 24 projecting from fuselage 2 and elongated laterally with respect to cross member 22 and parallel to a direction B perpendicular to direction A;
- a rib 26 parallel to cross member 22, located on the opposite side of cross member 22 to fuselage 2, and extending between respective ends 28, opposite cross member 22, of longitudinal members 23, 24; and
- a rib 27 interposed between cross member 22 and rib 26 in direction B, and extending between respective mid-portions of longitudinal members 23, 24.

To reduce the overall weight of frame 21, longitudinal members 23, 24 and ribs 26, 27 comprise a number of circular through cutouts, and cross member 22 comprises a single through cutout elongated parallel to direction B.

Longitudinal member 23 is located to the front of longitudinal member 24.

Longitudinal member 23 also comprises:
- a first opening 31 at the end opposite end 28, adjacent to cross member 22, and engaged by the end of duct 13 defining opening 14;
- a second opening 32 at end 28; and
- two openings 33, 34 on opposite sides of rib 27 and interposed between openings 31, 32 in direction B.

Each opening 31, 32, 33, 34 is bounded by:
- two parallel first sides perpendicular to directions A and B; and
- two parallel second sides parallel to direction B and extending between respective opposite ends of the first sides.

More specifically, the second sides are shorter than and radiused to the first sides.

Frame 21 also comprises a concave wall 35 symmetrical with respect to an axis perpendicular to directions A and B, and extending on the opposite side of longitudinal member 23 to longitudinal member 24.

More specifically, wall 35 comprises a first end edge hinged to the first side of opening 33 on the opposite side to rib 27; and a second end edge fixable releasably to the first side of opening 34 on the opposite side to rib 27.

Wall 35 is thus movable between a first position (FIGS. 4 and 5), in which it extends symmetrically with respect to rib 27, and the second end edge is fixed to the first side of opening 34 on the opposite side to rib 27; and a second position (FIG. 3), in which it is located on the cross member 22 side of rib 27.

When wall 35 is in the first position, openings 33, 34 face the inside of a cavity defined by wall 35.

Cover 40 (FIGS. 2 and 3) substantially comprises:
- a wall 41 having a first end edge hinged to a bottom edge of longitudinal member 23, and movable between a first position (FIG. 2), in which it covers longitudinal member 23 and wall 35 in the first position; and a second position allowing complete access to longitudinal member 23 and opening 32 to insert belt 10 inside compartment 20;
- a wall 42 opposite wall 41 and defining a cover for longitudinal member 24; and
- two walls 43, 44 having respective end edges 48, 49 hinged to respective top end edges 36, 37 of cross member 22 and rib 26.

Cover 40 also comprises a wall 45 covering rib 26; and a further wall (not shown) covering frame 21 on the opposite side of top end edges 36, 37 to walls 43, 44.

More specifically, wall 41 is curved and concave.

As shown in FIG. 2, when wall 41 is in the first position, a second end edge 47, parallel to and opposite the first end edge, of wall 41 is fixed releasably to a top end edge of longitudinal member 23, and extends parallel to axis B.

More specifically, the first end edge and the second end edge 47 are straight, and wall 41 comprises two curved further end edges, which extend between respective opposite ends of the first end edge and second end edge 47, and cooperate respectively with an outer surface of duct 13 and with wall 45 when wall 41 is in the first position.

In the first position, wall 41 is positioned with its axis of symmetry parallel to direction B.

Wall 43 comprises an end edge 38 opposite end edge 48; and two straight further end edges interposed between end edges 38 and 48.

Wall 43 is movable between a first position (FIG. 2), in which end edge 38 is fixed releasably to a top edge of rib 27, and the further end edges are parallel to direction B and fixed releasably to respective first portions of longitudinal members 23, 24 interposed between cross member 22 and rib 27; and a second position (FIG. 3), in which end edge 38 and the further end edges are raised off rib 27 and the first portions of longitudinal members 23, 24.

More specifically, in the first position, wall 43 extends from cross member 22 to rib 27 in direction B.

Similarly, wall 44 comprises an end edge 39 opposite end edge 49; and two further end edges interposed between end edges 39 and 49.

Wall 44 is movable between a first position (FIG. 2), in which end edge 39 is fixed releasably to a top end edge of rib 27, and the further end edges are fixed releasably to respective second portions of longitudinal members 23, 24 interposed between ribs 26 and 27; and a second position (FIG. 3), in which end edge 39 and the further end edges are raised off rib 27 and the second portions of longitudinal members 23, 24.

More specifically, in the first position, wall 44 extends from rib 26 to rib 27 in direction B.

When helicopter 1 is in the flight configuration (FIGS. 1 and 2), walls 41, 43, 44 are in their respective first positions, in which walls 41, 42, 43, 44, 45 and the further wall completely cover frame 21 to form an aerodynamic outer surface of wing 4.

More specifically, in the flight configuration, walls 41, 42 define the leading edge and trailing edge respectively of wing 4; walls 43, 44 define the topside of wing 4; and the further wall defines the underside of wing 4.

Compartment 20 (FIG. 5) comprises:
- a first portion 51 extending between ribs 26 and 27 in direction B, and between the second portions of longitudinal members 23 and 24 in direction A;
- a second portion 52 defined between wall 35 and the face, on the opposite side to longitudinal member 24, of a third portion of longitudinal member 23 extending between openings 33 and 34; and
- a third portion 53 extending between cross member 22 and rib 27 in direction B, and between the first portions of longitudinal members 23 and 24 in direction A, and communicating with duct 13 through opening 14.

Belt 10 substantially comprises portion 54 (FIG. 3) housed in compartment 20 of wing 4; a main portion 55 housed in duct 13; and a further end portion 56 (FIG. 1) opposite portion 54 and extending at least partly alongside side 6, between opening 15 of duct 13 and a feed opening of turret 3.

More specifically (FIG. 3), portion 54 of belt 10 comprises:
- a first portion 61 folded several times parallel to direction A and housed in portion 51 of compartment 20;
- a curved second portion 62 housed in portion 52 of compartment 20; and
- a third portion 63 folded several times parallel to direction A and housed in portion 53 of compartment 20.

Wings 4 are located higher than turret 3; and duct 13 extends, from wing 4 to opening 15, at gradually decreasing height with respect to wing 4 (FIG. 1).

More specifically, duct 13 comprises, from opening 14 to opening 15, a first portion 65 sloping downwards with respect to wing 4; a second portion 66 sloping downwards with respect to first portion 65; and a substantially horizontal third portion 67.

More specifically, second portion 66 is steeper than first portion 65.

When loading belt 10, walls 41, 43, 44 are set to their respective second positions (FIG. 3).

Belt 10 is inserted into compartment 20 through opening 32 in the direction indicated in FIG. 3, and is fed forward until portion 54 is housed inside compartment 20, portion 55 is housed inside duct 13, and portion 56 extends between opening 15 and turret 3.

In which case, portions 61, 62, 63 of portion 54 of belt 10 are housed in portions 51, 52, 53 of compartment 20 respectively.

At this point, walls 41, 43, 44 are moved into their respective first positions (FIG. 2) so cover 40 completely covers frame 21.

Helicopter 1 is therefore now in the flight configuration.

As weapon 8 is fired during the mission, belt 10 of ammunition 9 is fed forward inside compartment 20 and along duct 13 to weapon 8.

Forward feed of belt 10 is described below with reference to one piece of ammunition 9 located at opening 32.

As weapon 8 is fired, ammunition 9 travels sequentially through opening 32, along a number of alternating paths, parallel to direction A, inside portion 51 of compartment 20, and through opening 34. At this point, ammunition 9 is guided by wall 35, inside portion 52 of compartment 20, through opening 33, and travels along a number of alternating paths, parallel to direction A, inside portion 53 of compartment 20, and through opening 31.

At this point, ammunition 9 travels along portions 65, 66, 67 of duct 13, through opening 15, and along a lateral outer portion of fuselage 2 to turret 3 and weapon 8.

To inspect the arrangement of portion 54 of belt 10 inside compartment 20, once helicopter 1 lands, walls 41, 43, 44 are simply moved into their respective second positions.

The advantages of wing 4 according to the present invention will be clear from the above description.

In particular, compartment 20 defines an additional tank for ammunition 9, using wing 4 which is normally used for supporting other weapons or tanks.

Wing 4 therefore provides for increasing the amount of ammunition 9 that can be stored, with no need for additional storage facilities inside or outside helicopter 1.

Moreover, using an existing wing 4, compartment 20 in no way increases the overall drag of helicopter 1.

Walls 41, 43, 44 being movable into the second position, belt 10 can be inserted easily into compartment 20, and the correct arrangement of first portion 54 of belt 10 inside compartment 20 can later be inspected easily from the outside.

Finally, by virtue of wing 4 being on a level with opening 14 of duct 13, and duct 13 sloping downwards from opening 14 to opening 15, no motors are need to feed belt 10.

Clearly, changes may be made to wing 4 as described and illustrated herein without, however, departing from the protective scope defined in the accompanying Claims.

In particular, wing 4 may be applied to a different aircraft, e.g. a military aeroplane.

Moreover, the design of compartment 20 and the path of belt 10 may differ from those shown in FIGS. 1 to 5.

Wing 4 may even have no rib 27 and/or may be fitted inside with other systems for guiding and supporting belt 10, to improve slide of belt 10 and prevent weapon 8 from jamming.

Finally, belt 10 of ammunition 9 may be loaded and inspected inside compartment 20 otherwise than as shown in FIGS. 1 to 5.

The invention claimed is:

1. An aircraft comprising:
a wing;
a fuselage;
a turret at the front end of said fuselage and comprising at least one weapon; and
a feed duct for feeding said weapon with ammunition supplied in the form of a belt and extending along a side on the outside of said fuselage;
said wing being characterized by comprising a compartment for housing at least one portion of said belt and connected to a loading opening of said feed duct for loading said feed duct.

2. The wing of claim 1, further comprising a frame defining said compartment; and a cover; said cover covering said frame and defining an outer surface of the wing in a flight configuration of said aircraft (1).

3. The wing of claim 2, wherein said frame comprises a first longitudinal member elongated parallel to a first direction (B) and comprising a first opening, which is located at the opposite end of the first longitudinal member to a fuselage of said aircraft, and through which said belt is fed when loading the belt; said first longitudinal member also comprising a second opening opposite said first opening and for connecting said compartment, in use, to said loading opening of said feed duct.

4. The wing of claim 3, wherein said frame comprises a cross member fixable to said fuselage of said aircraft (1); and a first rib located, in use, on the opposite side of said cross member to said fuselage, and elongated parallel to a second direction (A) that is crosswise to said first direction (B);
said first rib and said cross member defining said compartment in said first direction (B).

5. The wing of claim 4, wherein said frame (21) comprises:
a second rib interposed between said cross member and first rib in said first direction (B);
a second longitudinal member elongated parallel to said first direction (B); and
a first wall located on the opposite side of said first longitudinal member to said second longitudinal member, and movable between a first position, in which it defines, with a face of said first longitudinal member on the opposite side to said second longitudinal member, a first portion (52) of said compartment, and a second position allowing free access to said first portion;
said first longitudinal member comprising a third and fourth opening, which are interposed in said first direction (B) between said first and second opening, are located on opposite sides of said second rib, and face a cavity defined by said first wall when said first wall is in said first position;
said compartment also comprising:
a second portion connected to said first portion by said third opening and defined between said first and second rib in said first direction (B); said second portion being defined, in said second direction (A), between first portions of said first and second longitudinal member interposed between said first and second rib; and
a third portion connected to said first portion, connectable to said feed duct by said fourth and second opening, and defined between said cross member and said second rib in said first direction (B); said third portion being defined, in said second direction (A), between second portions of said first and second longitudinal member interposed between said cross member and said second rib.

6. The wing of claim 5, wherein said cover (40) comprises a third and fourth wall; said third and fourth wall being movable between a closed configuration, in which they cover the top of said first and second longitudinal member, said first and second rib, and said cross member, and an open configuration allowing free access to said compartment.

7. The wing of claim 6, wherein said third and fourth wall have first end edges fixed to respective edges of said cross member and said first rib; and second end edges opposite respective first edges and connectable releasably to the same edge of said second rib.

8. The wing of claim 2, wherein said cover comprises a second wall movable between a first position, in which it covers said first longitudinal member, and a second position allowing free access to said first opening to insert said belt inside said compartment.

9. The wing of claim 8, wherein said second wall comprises a first end edge fixed to a first part of said first longitudinal member; and a second end edge opposite said first end edge and connectable releasably to a second part, distinct from the first part, of said first longitudinal member.

10. The aircraft comprising said weapon, said feed duct, and wing of claim 1.

11. The aircraft of claim 10, wherein said feed duct comprises an initial portion extending from said loading opening towards said weapon, and sloping downwards with reference to a normal flight condition of said aircraft.

12. A wing for an aircraft; said aircraft comprising at least one weapon, and a feed duct for feeding said weapon with ammunition supplied in the form of a belt; and the wing comprising a compartment for housing at least one portion of said belt and connectable to a loading opening for loading said feed duct;

the wing further comprising a frame defining said compartment; and a cover; said cover covering said frame and defining an outer surface of the wing in a flight configuration of said aircraft;

said frame comprising:

a first longitudinal member elongated parallel to a first direction and comprising a first opening, which is located at the opposite end of the first longitudinal member to a fuselage of said aircraft, and through which said belt is fed when loading the belt; said first longitudinal member also comprising a second opening opposite said first opening and for connecting said compartment, in use, to said loading opening of said feed duct; and a cross member fixable to said fuselage of said aircraft; and a first rib located, in use, on the opposite side of said cross member to said fuselage, and elongated parallel to a second direction crosswise to said first direction;

said first rib and said cross member defining said compartment in said first direction;

said frame further comprising:

a second rib interposed between said cross member and first rib in said first direction;

a second longitudinal member elongated parallel to said first direction; and a first wall located o the opposite side of said first longitudinal member to said second longitudinal member, and movable between a first position, in which it defines, with a face of said first longitudinal member on the opposite side to said second longitudinal member, a first portion of said compartment, and a second position allowing free access to said first portion;

said first longitudinal member comprising a third and fourth opening, which are interposed in said first direction between said first and second opening, are located on opposite sides of said second rib, and face a cavity defined by said first wall when said first wall is in said first position;

said compartment also comprising:

a second portion connected to said first portion by said third opening and defined between first and second rib in said first direction; said second portion being defined, in said second direction, between first portions of said first and second longitudinal member interposed between said first and second rib; and a third portion connected to said first portion, connectable to said feed duct by said fourth and second opening, and defined between said cross member and said second rib in said first direction; said third portion being defined, in said second direction, between second portions of said first and second longitudinal member interposed between said cross member and said second rib.

* * * * *